United States Patent [19]

Ishikawa et al.

[11] Patent Number: 5,301,768
[45] Date of Patent: Apr. 12, 1994

[54] FOUR-WHEEL DRIVE TORQUE TRANSFER MECHANISM

[75] Inventors: Wataru Ishikawa, Davis; Donald L. Margolis, El Masero, both of Calif.; Minh Tran, Inkster, Mich.

[73] Assignee: Aisin AW Co., Ltd., Japan

[21] Appl. No.: 878,235

[22] Filed: May 4, 1992

[51] Int. Cl.⁵ .................................. B60K 17/35
[52] U.S. Cl. .......................... 180/249; 180/197; 364/424.1
[58] Field of Search ............... 180/249, 248, 197; 364/424.1, 426.03

[56] References Cited

U.S. PATENT DOCUMENTS

| | | |
|---|---|---|
| 4,860,208 | 8/1989 | Bantle .................. 180/249 |
| 4,936,406 | 6/1990 | Tezuka et al. ......... 180/249 |
| 5,060,747 | 10/1991 | Eto ..................... 180/249 |
| 5,070,961 | 12/1991 | Tezuka ................. 180/249 |
| 5,071,396 | 12/1991 | Kobayashi ............. 180/249 |
| 5,097,921 | 3/1992 | Tezuka ................. 180/249 |
| 5,197,566 | 3/1993 | Watanabe et al. ...... 180/249 |

OTHER PUBLICATIONS

Wong, J. Y., Ph.D., Theory of Ground Vehicles, John Wiley & Sons, New York, pp. 210–239.
SAE Technical Paper Series, 880701, Margolis, Donald L. and Frank, Andrew A., "Directional Stability Augmentation for All Wheel Drive Vehicles".
Cohen, Alan M., Numerical Analysis, Halsted Press, New York pp. 296–307, 334–335.

Primary Examiner—Margaret A. Focarino
Assistant Examiner—Kevin Hurley
Attorney, Agent, or Firm—Lorusso & Loud

[57] ABSTRACT

A four-wheel drive torque transfer mechanism splits torque from the transmission gearing section of a vehicle into a front-wheel torque and a rear-wheel torque, transmitting the front-wheel torque to the front-wheel drive shafts and the rear-wheel torque to the rear-wheel drive shafts. A central differential connected to the transmission gearing section distributes the torque from the transmission gearing section. A central differential limiting mechanism, provided between the input and output sides of the central differential, limits the rotary differential operation of the differential arrangement responsive to a control torque signal. Control gain values representing optimized turning characteristics are calculated for each of the turning conditions of the vehicle and stored in a memory. A controller for controlling the differential limiting mechanism reads the control gain values from the memory and calculates the products of detected turning conditions and the control gain values corresponding thereto. The controller further calculates the sum of the products and generates the control torque signal in accordance with that calculated sum.

13 Claims, 8 Drawing Sheets

FOUR-WHEEL DRIVE TORQUE TRANSFER MECHANISM

BACKGROUND OF THE INVENTION

The present invention relates to a four-wheel drive torque transfer mechanism for selectively distributing torque between the front and the rear wheels of an automobile.

Conventional drive systems for running automobiles include front wheel drive systems and rear wheel drive systems. A front wheel drive system is generally more stable than a rear wheel drive system. However, in making a turn, a front wheel drive system loses cornering power to the extent that a large steering angle must be maintained.

While a rear wheel drive system gives more satisfactory turning performance, the use of the rear wheel drive system may lead to over-turning when the torque is too high.

Thus, ideally, the driving torque should be distributed equally to the front and the rear wheels. Toward this end, a four-wheel drive vehicle has been proposed in which the torque of the engine is distributed to the front and the rear wheels by a central differential gear. In the power transmission of such a four-wheel drive vehicle, the engine torque is first transmitted to the central differential gear, which consists of a gear unit composed of pinions having side gears on both sides thereof, or a planetary gear unit. The torque transmitted to the central differential gear is distributed forwardly and rearwardly. The forwardly distributed torque is transmitted to a front-wheel differential gear, where it is distributed again by right and left side gears to the right and the left front wheels. The rearwardly distributed torque is transmitted through a rear-wheel-drive propeller shaft to a rear-wheel differential gear, where it is further distributed by right and left side gears to the right and the left rear wheels.

The central differential gear prevents the occurrence of the so-called tight corner braking, a phenomenon in which a difference in rotation between the front and the rear wheels causes a braking action when a vehicle makes a sharp turn at low speed on a road surface having a low coefficient of friction. Further, the central differential gear helps to increase the torque-transmission limit value during turning. In addition, this gear maximizes the traction force when the front and the rear wheels are driven by the same torque.

However, if any one of the four driving wheels of the four-wheel drive vehicle is brought into a no-load state as a result of slipping, for example, on a snowy or frozen road surface, the differential operation of the central differential gear will cause the drive energy to escape through that slipping wheel, thereby making the transmission of torque to the wheels with traction impossible.

In view of the foregoing problem, a differential limiting mechanism for stopping the differential operation of the central differential gear is conventionally provided. The differential limiting mechanism is composed of a wet-type multi-disc friction clutch and a hydraulic servo. Under normal operating conditions, the multi-disc friction clutch is released to maintain the central differential gear in the differential operating mode, so that the torque is distributed to the front and the rear wheels. If any one of the wheels slips or threatens to slip on a snowy or frozen road surface or the like, the multi-disc friction clutch is engaged to bring the central differential gear into a direct drive mode.

The slipping limit characteristic of a driving wheel is determined by the vertical load on the surface of the tire which is in contact with the ground, and this load varies depending mainly upon the weight distribution of the vehicle. Accordingly, when the central differential gear is brought into the direct drive position, not only does a loss occur in torque transmission, but the parts of the multi-disc friction clutch, the gears, etc. are subjected to wear. Further, when the torque is gradually increased in the mode where the multi-disc friction clutch is released and the central differential gear is in the differential operating mode, either the front or the rear wheels will slip, making a further increase in torque impossible. In other words, the torquetransmission limit value is determined by the smaller of the two values of torque distributed to the front and the rear wheels. If, for example one, of the front wheels slips, the torque for the rear wheels will be reduced instantaneously, thereby making it impossible to transmit torque satisfactorily to the road surface.

In view of the foregoing, a four-wheel drive torque controller has been proposed in which a differential limiting clutch is arranged in parallel with the central differential gear. The engagement, i.e. the amount of slip, of this differential limiting clutch is continuously controlled by a controller, thereby increasing the torque-transmission limit valve, gradability and traction force of the vehicle and improving the stability of the vehicle when running on a snowy or frozen road or the like (see Japanese Patent Laid-Open No. 63-176728).

Further, a four-wheel drive torque controller has been proposed in which the torque ratio is continuously controlled to improve the turning and maneuvering characteristics and running ability of the vehicle (see Japanese Patent Laid-Open No. 63-34230).

The use of such a four-wheel drive torque controller in a four-wheel drive vehicle provides the advantage that any change in the steering angle during turning is detected by a steering angle sensor, and, on the basis of the value of the detected steering angle, the angular velocity (the yaw rate) of this steering angle is calculated. In accordance with this calculated yaw rate the controller controls the slippage of the differential limiting clutch. Thus, it is possible to distribute torque in a fixed ratio as needed during turning, thereby improving the turning and maneuvering characteristics of the vehicle.

However, the turning and maneuvering characteristics of a four-wheel drive vehicle when it actually makes a turn are influenced not only by the yaw rate of the steering angle, but also by the vehicle velocity, vehicle lateral acceleration, etc. Unless an appropriate torque distribution is effected in accordance with all these factors, the vehicle will fall into an understeering or an oversteering condition.

SUMMARY OF THE INVENTION

The present invention has been made with a view of solving the above problem in the conventional four-wheel drive controller described above. It is an object of the present invention to provide a four-wheel drive torque transfer mechanism which makes it possible to distribute engine torque properly to the front and the rear wheels in accordance with the values of the vehicle velocity, the vehicle lateral acceleration, the yaw rate of the steering angle, etc.

In the four-wheel drive torque transfer mechanism of the present invention, the above object is achieved by splitting torque output from the transmission into a torque for the front wheels and a torque for the rear wheels, the former being transmitted to front wheel drive shafts and the latter to rear wheel drive shafts.

A differential gear connected to the transmission gear section distributes the torque from the transmission gear section by a rotary differential operation. Further, a differential limiting device is provided between the input and the output sides of the differential gear. The differential limiting device restricts the rotary differential operation of the differential gear, and produces a difference between the torque for the front wheels and the torque f or the rear wheels, and uses the difference as a control torque.

Further, a detector detecting the turning conditions is provided. A control gain for obtaining an optimum turningcharacteristic value is calculated and set for each turning condition, and is stored in a memory.

A control device for controlling the differential limiting device -reads from the memory the control gains respectively corresponding to the turning conditions. The product of each turning condition and the corresponding control gain is calculated. Further, the sum of the products thus obtained is calculated and used as the above-mentioned control torque. An electric signal corresponding to this control torque is supplied to the differential limiting device.

The turning conditions include at least the velocity, lateral acceleration, and yaw rate of the vehicle. The turning characteristic value is a value calculated on the basis of the understeering coefficients of the driving wheels. Further, the differential limiting device includes a differential limiting clutch, a hydraulic servo for controlling the slippage of the differential limiting device, and a solenoid value for supplying the hydraulic servo with a fluid pressure corresponding to the control signal. The differential gearing consists of pinions having side gears on both sides thereof, or a planetary gear unit.

BRIEF DESCRIPTION OF THE DRAWINGS

The structure and features of the four-wheel drive torque transfer mechanism of the present invention will become apparent from the following description with reference to the accompanying drawings, in which.

DESCRIPTION OF PREFERRED EMBODIMENT

Figure 1:
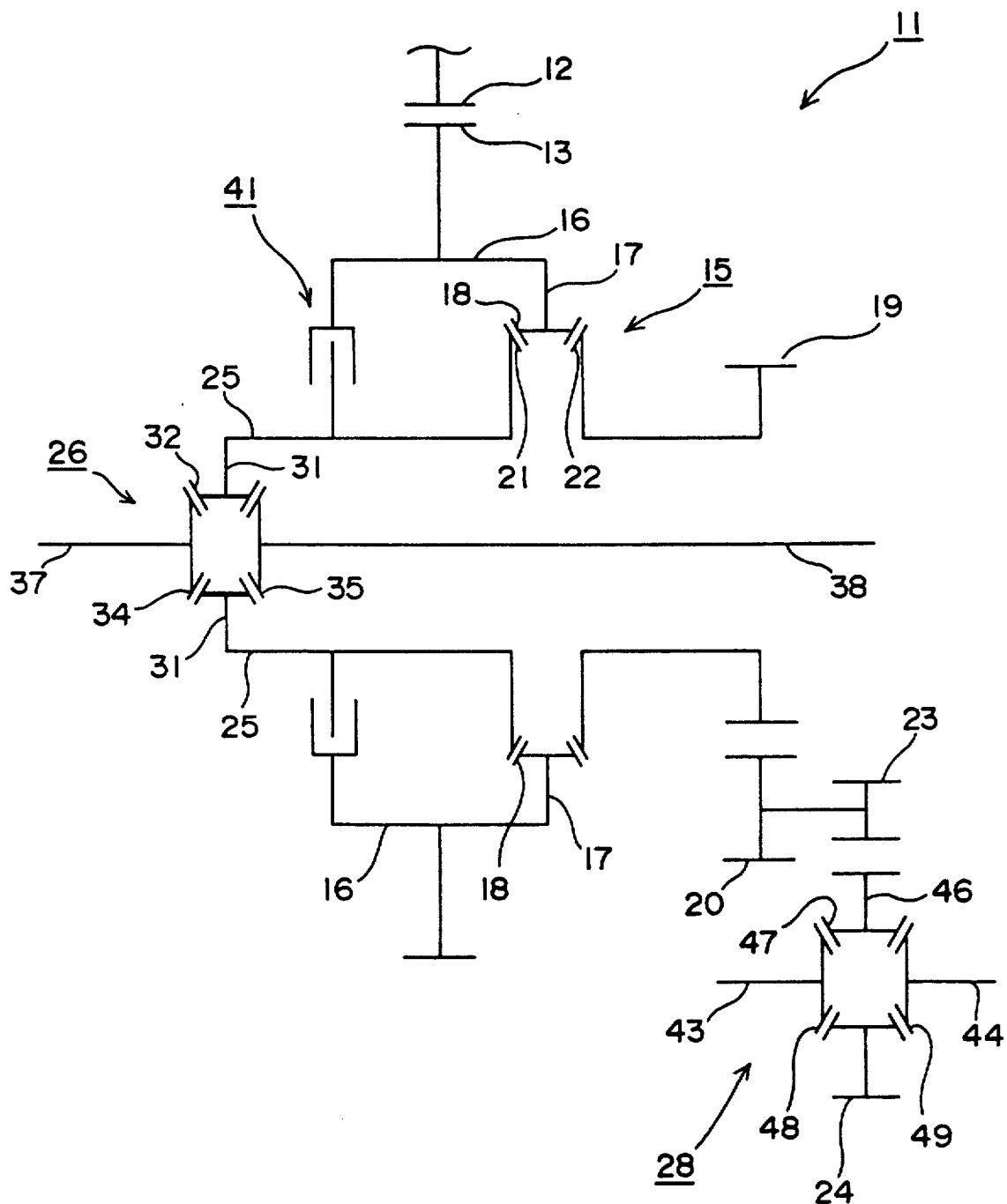
FIG. 1 is a schematic illustration of the power transmission system of a four-wheel drive vehicle to which the four-wheel drive torque transfer mechanism of the present invention is applied.

FIG. 1 illustrates a four-wheel drive transmission 11 to which the four-wheel drive torque transfer mechanism of the present invention is applicable. The four-wheel drive transmission system 11 as shown in FIG. 1 receives torque from a conventional automatic transmission. An output gear 12 of the automatic transmission connected to a ring gear 13 of the four-wheel drive transmission system 11. The ring gear 13 is connected to a central differential case 16 of a central differential gear 15 and rotates the center differential case 16.

A plurality of pinion shafts 17 are mounted circumferentially on the center differential case 16, and a pinion 18 is rotatory supported by each pinion shaft 17. Side gears 21 and 22 are respectively arranged on opposing sides of the pinions 18 with respect to the direction in which the vehicle runs. The pinions 18 mesh with the side gears 21 and 22. The side gear 21 is connected to a front differential case 25 and rotates the front differential case 25 to transmit torque to a front-wheel differential gear 26.

The side gear 22 is connected to a counter drive gear 19, which is meshed with a counter driven gear 20. The counter driven gear 20 is integrally connected with a reduction gear 23. Thus, the rotation of the side gear 22 is reversed, making it possible to transmit torque to the reduction gear 23, which rotates integrally with counter driven gear 20. A ring gear 24, formed on the outer periphery of a rear-wheel differential gear, is meshed with the reduction gear 23, so that torque is transmitted to a rear-wheel differential gear 28 after being reduced by the reduction gear 23 and the ring gear 24.

Thus, the torque transmitted to the center differential case 16 is split between the front and the rear wheels by the side gears 21 and 22 of the central differential gear 15.

The front-wheel differential gear 26 is connected to the side gear 21 through the intermediation of the front differential case 25 and distributes the torque transmitted thereto, through the front differential case 25, to the right and the left front drive wheels. For this purpose, a plurality of pinion shafts 31 are mounted circumferentially on the front differential case 25, and a pinion 32 is rotatably supported by each pinion shaft 31. Side gears 34 and 35 are respectively provided on opposing sides of the pinions 32 relative to the direction in which the vehicle runs. The pinions 32 and the side gears 34 and 35 are meshed.

The side gears 34 and 35 are respectively connected to the right and the left front-wheel drive shafts 37 and 38. The torque for the front wheels transmitted to the front differential case 25 is split by the side gears 34 and 35 of the front-wheel differential gear 26 and transmitted to the right and the left front drive wheels through the front-wheel drive shafts 37 and 38.

The rear-wheel differential gear 28 has the same construction as that of the front-wheel differential gear 26 and distributes the torque for the rear wheels, transmitted thereto through the ring gear 24, to the right and the left rear drive wheels. For this purpose, a plurality of pinion shafts 46 are mounted circumferentially on the rear differential case of the rear-wheel differential gear 28, and a pinion 47 is rotatably supported by each pinion shaft 46. Side gears 48 and 49 are respectively arranged on opposing sides of the pinions 47, relative to the direction in which the vehicle runs. The pinions 47 and the side gears 48 and 49 are meshed.

The side gears 48 and 49 are connected to the right and the left rear-wheel drive shaft 43 and 44, respectively. The torque for the rear wheels, transmitted to the ring gear 24, is split by the side gears 48 and 49 of the rear-wheel differential gear 28 and transmitted to the right and the left drive wheels through the rear-wheel drive shafts 43 and 44.

A differential limiting clutch 41, which serves as a differential limiting device, is provided between the center differential case 16 and the side gear 21 of the central differential gear 15. By adjusting the degree of engagement, i.e. the slippage, of the differential limiting clutch 41, it is possible to continuously distribute torque to the front and the rear wheels in a ratio ranging from 50/50 to 100/0 and, at the same time, to effect differential limiting action.

Next, the operation of the power transmission system 11, constructed as described above, will be explained.

The rotational speed of the engine is changed as it is transmitted through the automatic transmission gearing in accordance with the gear ratios of the gear reduction steps and is transmitted to the center differential case 16 through the output gear 12 and the ring gear 13.

Assuming that the differential limiting clutch 41 has been completely released, the rotation of the center differential case 16 is transmitted, on one side, through the side gear 22 to the counter drive gear 19, and is further transmitted through the counter driven gear 20 to the rear-wheel differential gear 28 to drive the right and the left rear-wheel drive shafts 43 and 44. On the other side, the rotation of the center differential case 16 is transmitted through the side gear 21 to the front differential case 25 of the front-wheel differential gear 26, and is further transmitted to the right and the left side gears 34 and 35, from which it is transmitted to the right and the left front-wheel drive shafts 37 and 38. In this way, the torque input to the center differential case 16 is split between the front and rear wheels.

When the differential limiting clutch 41 is engaged, the rotation of the center differential case 16 is directly transmitted to the front differential case 25 through the differential limiting clutch 41 in accordance with the slippage of the differential limiting clutch 41, and rotates the front-wheel drive shafts 37 and 38. In this way, it is possible to limit the differential operation of the front and the rear wheels and to vary the torque ratio in accordance with the slippage of the differential limiting clutch 41.

Next, a four-wheel drive controller for controlling the slippage of the differential limiting clutch 41 will be described.

Figure 2:
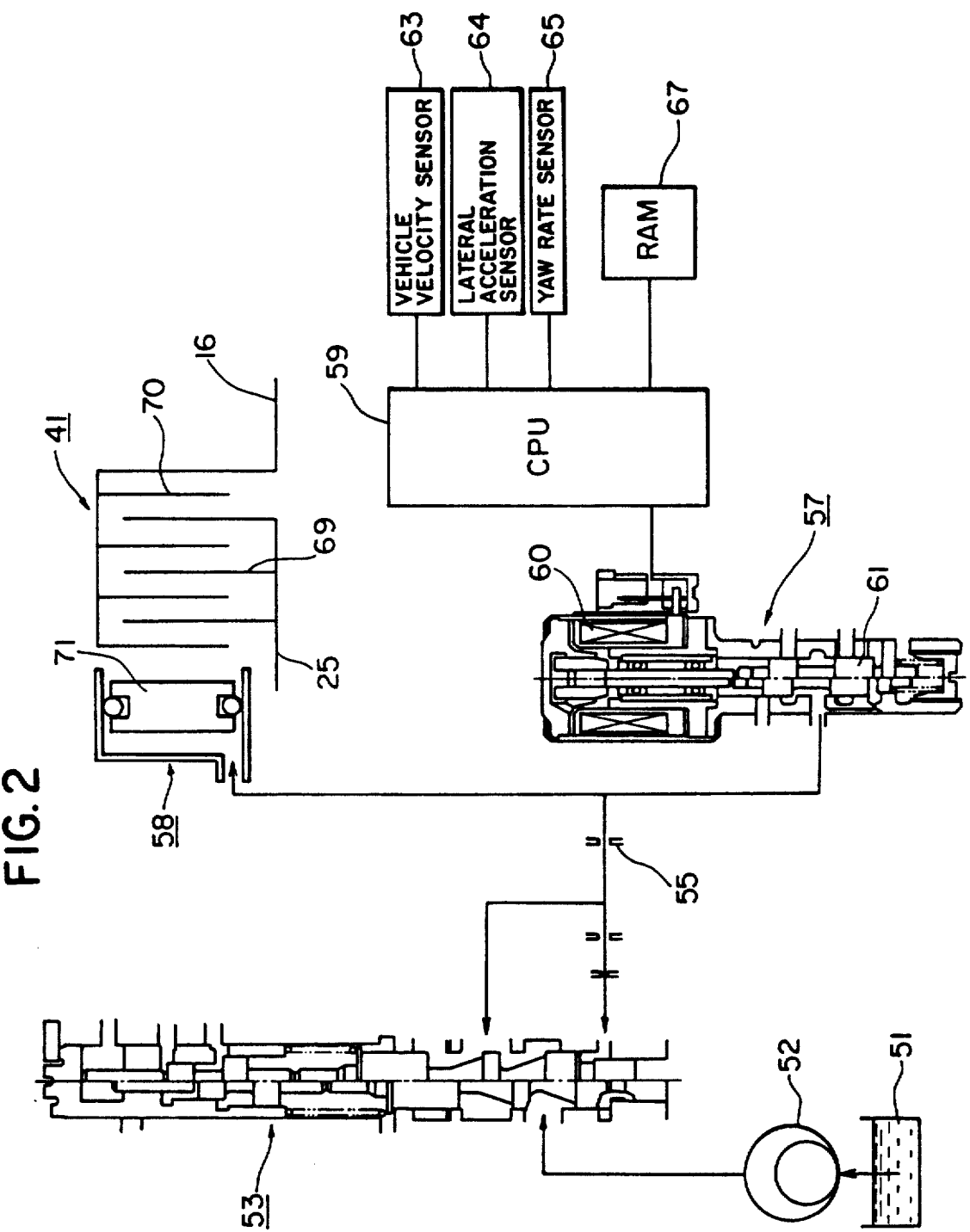
FIG. 2 is a conceptual drawing illustrating essential parts of the four-wheel drive torque transfer mechanism of the present invention.

FIG. 2 is a conceptual drawing illustrating essential parts of the four-wheel drive controller of the present invention.

In the drawing, oil from an oil sump 51 is supplied by an oil pump 52 to a regulator 53, where the oil is adjusted to a line pressure. After being conveyed through an orifice 55, the oil at the line pressure is further pressure-controlled by an electronically controlled linear solenoid valve 57, and is supplied to a hydraulic servo 58 of the differential limiting clutch 41.

The linear solenoid valve 57 has a spool 61 positioned by electromagnetic force generated by a solenoid 60 in accordance with an electric signal supplied from a controller (a CPU 59), thereby generating a regulated oil pressure corresponding to the electric signal. The oil at the regulated oil pressure obtained from the linear solenoid valve 57 is supplied to the hydraulic servo 58.

Data for controlling the linear solenoid valve 57 is input to the CPU 59, to which are connected a vehicle velocity sensor 63, lateral acceleration sensor 64, and a yaw rate (steering-angle angular velocity) sensor 65, and, further, a steering sensor, velocity sensors for the individual drive wheels, etc. Reference numeral 67 indicates a memory, i.e. RAM, for storing data as needed.

The differential limiting clutch 41 includes discs 69 and plates 70 which are engaged or released or slip at a fixed slippage by means of the hydraulic servo 58, thereby making it possible to continuously effect the transmission and interruption of torque between the center differential case 16 and the front differential case 25. The slippage can be changed by means of the linear solenoid valve 57, which produces the regulated pressure of the oil supplied to the hydraulic servo 58. In accordance with changes in this regulated pressure, a piston 71 of the hydraulic servo 58 advances or retreats, thereby changing the degree of engagement between the discs 69 and the plates 70.

In the four-wheel drive controller, constructed as described above, torque distribution can be continuously effected within the range from 0 to lockup between the front-wheel drive shafts (37 and 38) and the rear-wheel drive shafts (43 and 44).

For this purpose, the CPU 59 calculates a control torque $T_c$, and a difference corresponding to the control torque $T_c$ is generated between the front-wheel torque $T_f$ transmitted to the front-wheel drive shafts 37 and 38 and the rear-wheel torque $T_r$ transmitted to the rear-wheel drive shafts 43 and 44, both torques being controlled by the differential limiting clutch 41.

Assuming that the engine torque output through the automatic transmission gearing is $T_E$, the front-wheel torque $T_f$ can be expressed as:

$$T_f = (\tfrac{1}{2}) \cdot T_E + (\tfrac{1}{2}) \cdot T_c \tag{1}$$

and the rear-wheel torque $T_r$ can be expressed as:

$$T_r = (\tfrac{1}{2}) \cdot T_E - (\tfrac{1}{2}) \cdot T_c \tag{2}$$

The CPU 59 calculates the control torque $T_c$ using the following equation:

$$T_c = K_1 u + K_2 a_{lat} + K_3 \omega \tag{3}$$

where
- u: vehicle velocity;
- $a_{lat}$: lateral acceleration;
- $\omega$: yaw rate;
- $K_1 - K_3$: control gains.

When the control torque $T_c$ has been calculated by the CPU 59 in accordance with equation (3), a control signal corresponding to this control torque $T_c$ is supplied to the linear solenoid valve 57, thereby regulating the pressure of the oil supplied to the hydraulic servo 58.

In equation (3), the control torque $T_c$ can be calculated by multiplying the control gains $K_1-K_3$ by the vehicle velocity u, the lateral acceleration $a_{lat}$ and the yaw rate $\omega$, respectively. To optimize the turning characteristics of the vehicle, the control gains $K_1-K_3$ are optimized by using the multi-stage Monte Carlo optimization method.

For this purpose, a turning-characteristic value J for evaluating turning characteristics is calculated for each of the variations of the control gains $K_1-K_3$. The control gains $K_1-K_3$ are adjusted such that the turning-characteristic value J is minimal.

During turning, the vehicle is brought into an understeering, oversteering or neutral steering condition depending upon running and turning conditions, such as the steering condition. From the viewpoint of turning characteristics, neutral steering is preferred. In understeering, the response to the steering input is rather slow, resulting in a slow turning movement. In oversteering, the vehicle is rather unstable, making steering difficult.

The above three states can be identified by understeering coefficients $K_{usi}$, which are used to evaluate the behavior of the vehicle during turning. If the coefficients are positive values, the vehicle is understeering. If they are negative values, the vehicle is oversteering; and if they are 0, the vehicle is in neutral steering. Accordingly, the turning-characteristic value J is defined using the understeering coefficients $K_{usi}$. The turning-characteristic value J is minimized by minimizing the understeering coefficients $K_{usi}$.

In this regard, turning simulation is performed for a fixed time to define the turning-characteristic value J as the sum of the squares of the understeering coefficients $K_{usi}$ of the drive wheels (i = 1,2,3,4), as shown in the following equation (4):

$$J = \int_0^t \left( \sum_i (K_{usi})^2 \right) dt \tag{4}$$

The values of the control gains (signal amplification values) $K_1-K_3$ are not universally applicable to various turning conditions. However, the turning conditions for ordinary operation are limited, and, within the limitation, there is no substantial difference in the control torque $T_c$. Accordingly, if the control gains $K_1-K_3$ determined by the above turning simulation are stored in the form of a table in the ROM 67, the control gains $K_1-K_3$ can be read and utilized when the vehicle makes a turn.

That is, if the CPU 59 reads the control gains $K_1-K_3$ from the ROM 67 and performs the computation of equation (3) on the basis of the control gains $K_1-K_3$ it is possible to effect optimum torque distribution in accordance with the turning conditions, such as the vehicle velocity u, lateral acceleration $a_{lat}$, and yaw rate $\omega$.

Further, when the vehicle makes a turn under unusual turning conditions, such as when turning to one of the extremes, a special turning torque $T_c$ is required. Therefore, control gains $K_1-K_3$ for unusual turning conditions are separately stored in the RAM 67.

When torque is distributed by the above control method, the understeering coefficients $K_{usi}$ for the drive wheels are minimum, so that it is possible for the vehicle to make a turn under conditions akin to the neutral steering condition. At the sale time, an appropriate torque ratio is obtained for the drive wheels, so that no one drive wheel is allowed to reach the limit by itself. Thus, it is possible for the vehicle to make a turn not only with greater turning power but also in a more stable manner. Further, since the vehicle can turn with turning characteristics akin to the neutral steering state, the centripetal acceleration of the vehicle is small, thus stabilizing the turning.

Further, since the yaw rate $\omega$ is used in the calculation of the control torque $T_c$, torque can be distributed quickly in response to steering input.

Moreover, the requisite control $T_c$ at the time of turning can be minimized, thereby improving the reliability of the system.

Various optimization algorithms have been proposed for the calculation of optimum values for the control system. However, these algorithms are very hard to apply to dynamic optimization as in the case of the calculation of the control gains $K_1-K_3$ for the torque distribution at the time of turning. In view of this, the multi-stage Monte Carlo optimization method is adopted, as stated above.

In multi-state Monte Carlo optimization, the iterative random method is employed, according to which a group of control gains $K_1-K_3$, are generated in the initial state of each simulation so as to calculate a turning-characteristic value J. This process is repeated, with a turning-characteristic value J being calculated each time. Each one is compared with the previous one. When it is smaller than the previous one, the turning-characteristic value J as stored in the RAM 67 is updated, and the corresponding values of control gains $K_1-K_3$ are stored.

The above process is repeated until optimum or quasi-optimum values of the control gains $K_1-K_3$ are found. While in equation (3) the control torque $T_c$ is calculated by using the vehicle velocity u, lateral acceleration $a_{lat}$, and the yaw rate w as the variables, the control torque $T_c$ can be calculated using other, additional variables. Any additional variables are input to the CPU 59 as turning conditions for the vehicle. Further, there are provided control gains respectively corresponding to the additional variables.

Next, the power transmission system 11 used in the four-wheel drive controller of the present invention will be described with reference to a bond graph.

Figure 3:
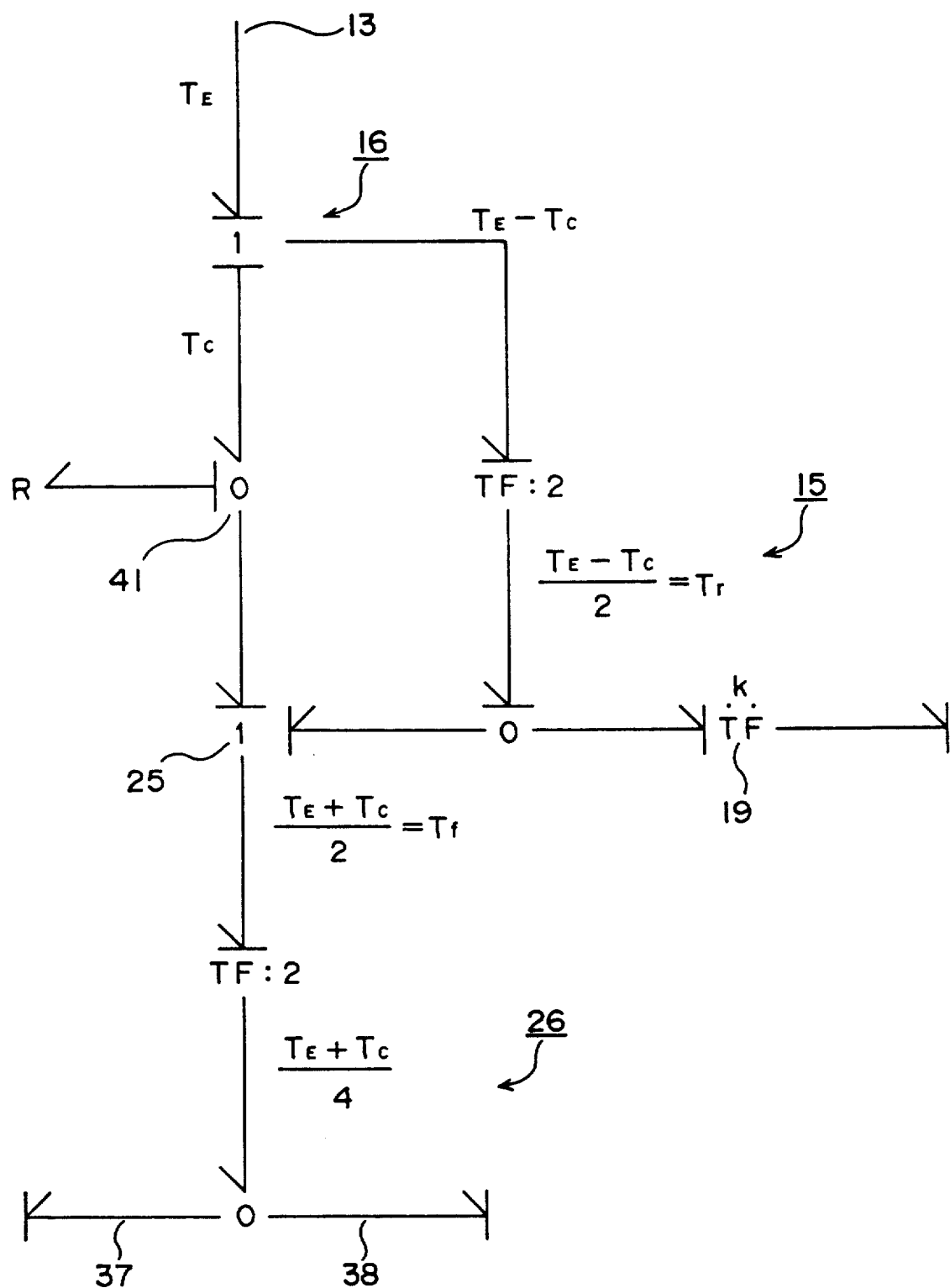
FIG. 3 is a bond graph of the power transmission system of the four-wheel drive torque transfer mechanism of the present invention.

FIG. 3 is a bond graph of the power transmission system in the four-wheel drive controller of the present invention.

As shown in the drawing, the engine torque $T_E$ input through the ring gear 13 is split by the center differential case 16 into a control torque $T_c$ which is transmitted to the differential limiting clutch 41 and torque $(T_E-T_c)$ which is transmitted to the central differential gear 15. The torque transmitted to the central differential gear 15 is torque-converted at the gear ratio of 2 of the pinions 18 (FIG. 1) and the side gears 21 and 22 to become the torque for the rear wheels, which is given by equation (2):

$$T_r=(\tfrac{1}{2})\cdot T_E-(\tfrac{1}{2})\cdot T_c$$

The torque for the rear wheels, $T_r$, is transmitted to the counter drive gear 19 and, at the same time, to the front differential case 25 of the front-wheel differential gear 26. The torque for the rear wheels, $T_r$, transmitted to the counter drive gear 19, is torque-converted at a gear ratio k which depends upon the counter drive gear 19, the counter driven gear 20, the reduction gear 23 and the ring gear 24, and is transmitted to the rear-wheel drive shafts 43 and 44.

The control torque $T_c$, transmitted to the differential limiting clutch 41, is changed in rotational frequency in accordance with the slippage and transmitted to the front differential case 25 of the front-wheel differential gear 26, where it is joined with the engine torque to become a torque $(T_E+T_c)$.

In the front-wheel differential gear 26, the torque is converted at the gear ratio of 2 of the pinions 32 and the side gears 34 and 35 to become the torque for the front wheels, which is given by equation (1):

$$T_f=(\tfrac{1}{2})\cdot T_E+(\tfrac{1}{2})\cdot T_c$$

The torque is transmitted to the front-wheel drive shafts 37 and 38.

Next, the results of running tests with a vehicle equipped with a four-wheel drive controller constructed as described above will be described.

Figure 4:
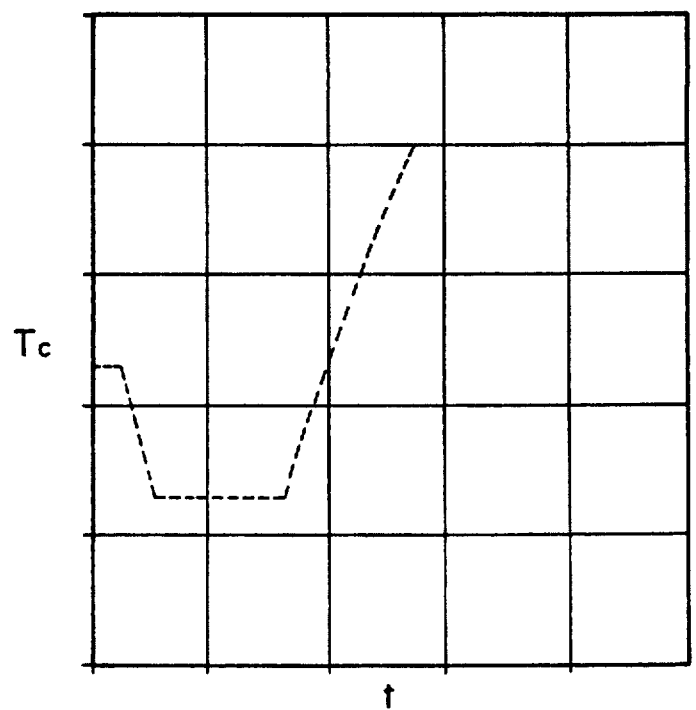
FIG. 4 is a time chart illustrating control torque in a conventional four-wheel drive torque transfer mechanism.
Figure 5:
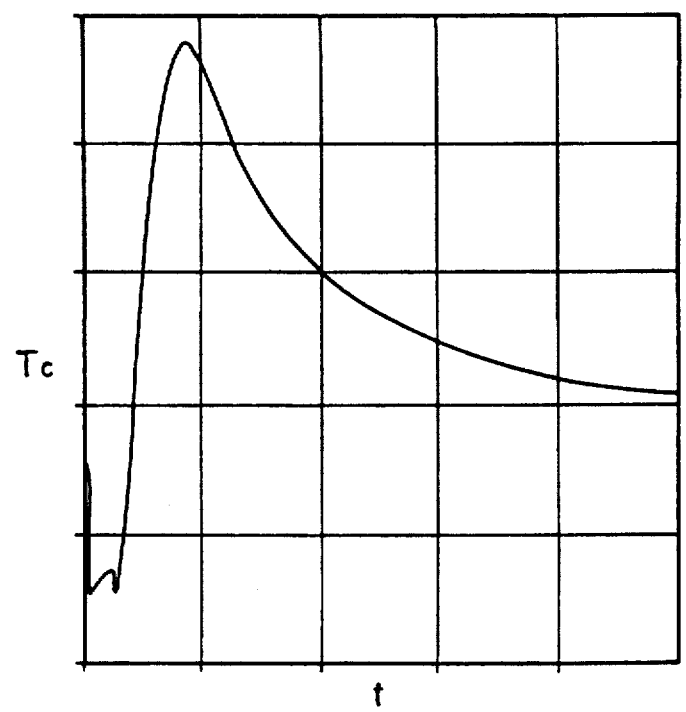
FIG. 5 is a time chart illustrating control torque in the four-wheel drive torque transfer mechanism of the present invention.

FIG. 4 is a time chart of a control torque in a conventional four-wheel drive controller, and FIG. 5 is a time chart of a control torque in the four-wheel drive controller of the present invention.

In the conventional four-wheel drive controller, the control torque $T_c$ is stored in the ROM 67 of the CPU 59 in the form of a map. There is set, in this map, a control torque $T_c$, which corresponds to the time elapsed after starting a turn, as shown in the drawing. Thus, by referring to this map, torque is distributed with the preset control torque $T_c$.

In the four-wheel drive controller of the present invention, the control torque $T_c$ is calculated by the CPU 59 in accordance with equation (3). Accordingly, the control torque $T_c$ varies as shown in FIG. 5 as the turning conditions, such as vehicle velocity u, lateral acceleration $a_{lat}$, and yaw rate $\omega$, vary.

Figure 6:
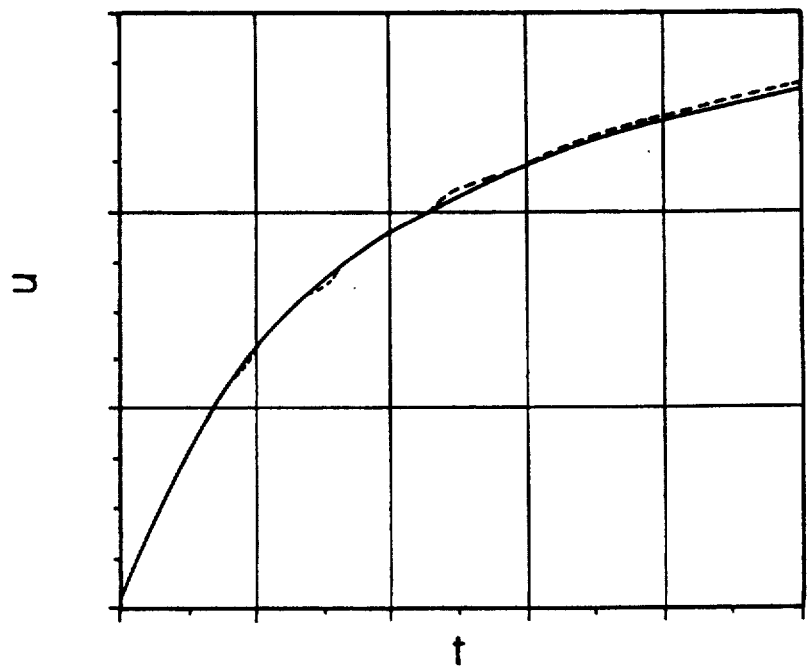
FIG. 6 is a chart showing the velocity of a vehicle equipped with the four-wheel drive torque transfer mechanism of the present invention as compared with that of a vehicle equipped with a conventional four-wheel drive torque transfer mechanism.

FIG. 6 is a chart showing the velocity of a vehicle equipped with tire four-wheel drive controller of the present invention as compared with the velocity of a vehicle equipped with a conventional four-wheel drive controller.

In the drawing, the solid line represents the velocity u in the forward running direction of the vehicle equipped with the four-wheel drive torque transfer mechanism of the present invention, and the broken line represents the velocity u in the forward running direction of the vehicle equipped with the conventional four-wheel drive torque transfer mechanism.

As will be explained below, the vehicle equipped with the four-wheel drive torque transfer mechanism of the present invention shows a slippage in the forward running direction which is less than that of the vehicle equipped with the conventional four-wheel drive torque transfer mechanism, and exhibits an accordingly higher velocity in the forward running direction.

Figure 7:
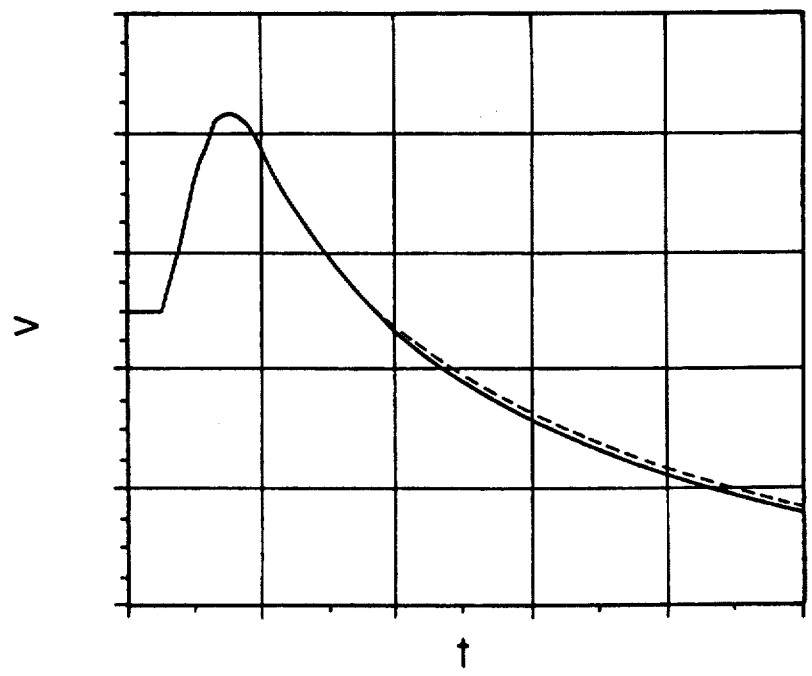
FIG. 7 is a chart showing the velocity in the lateral direction of a vehicle equipped with the four-wheel drive torque transfer mechanism of the present invention as compared with that of a vehicle equipped with a conventional four-wheel drive torque transfer mechanism.

FIG. 7 is a chart showing the velocity in the lateral direction of a vehicle equipped with the four-wheel drive torque transfer mechanism of the present invention as compared with that of a vehicle equipped with a conventional four-wheel drive torque transfer mechanism.

In the drawing, the solid line represents the velocity v in the lateral direction of the vehicle equipped with the four-wheel drive torque transfer mechanism of the present invention, and the broken line represents the velocity v in the lateral direction of the vehicle equipped with the conventional four-wheel drive torque transfer mechanism.

As will be shown below, the vehicle equipped with the four-wheel drive torque transfer mechanism of the present invention shows a slippage in the lateral direction less than that of the vehicle equipped with the conventional f our-wheel drive controller, and has an accordingly higher velocity in the lateral direction.

Figure 8:
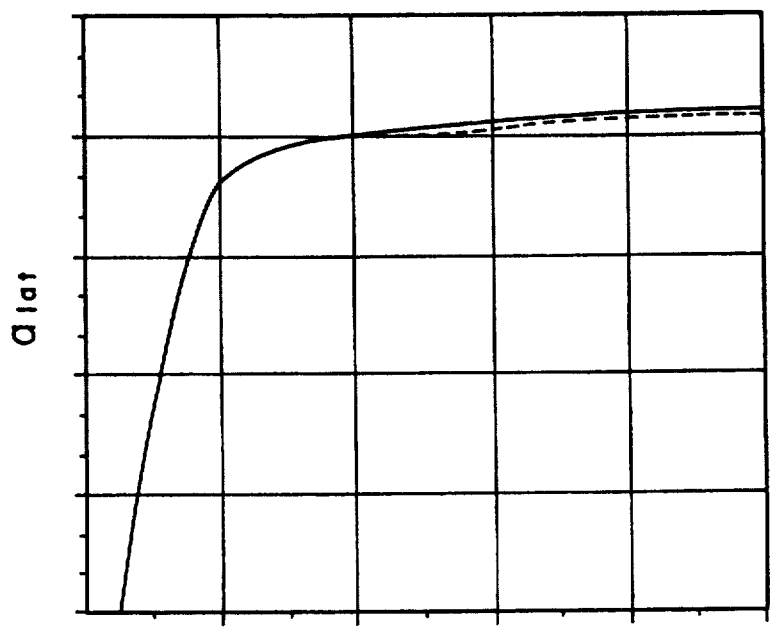
FIG. 8 is a chart showing the lateral acceleration of a vehicle equipped with the four-wheel drive torque transfer mechanism of the present invention as compared with that of a vehicle equipped with a conventional four-wheel drive torque transfer mechanism.

FIG. 8 is a chart showing the lateral acceleration of a vehicle equipped with the four-wheel drive torque transfer mechanism of the present invention as compared with that of a vehicle equipped with a conventional four-wheel drive torque transfer mechanism.

In the drawing, the solid line represents the lateral acceleration $a_{lat}$ of the vehicle equipped with the four-wheel drive torque transfer mechanism of the present invention, and the broken line represents the lateral acceleration $a_{lat}$ of the vehicle equipped with the conventional four-wheel drive torque transfer mechanism.

The vehicle equipped with the four-wheel drive torque transfer mechanism of the present invention has a lateral acceleration $a_{lat}$ higher than that of the vehicle equipped with the conventional four-wheel drive torque transfer mechanism, and exhibits accordingly better turning characteristics.

Figure 9:
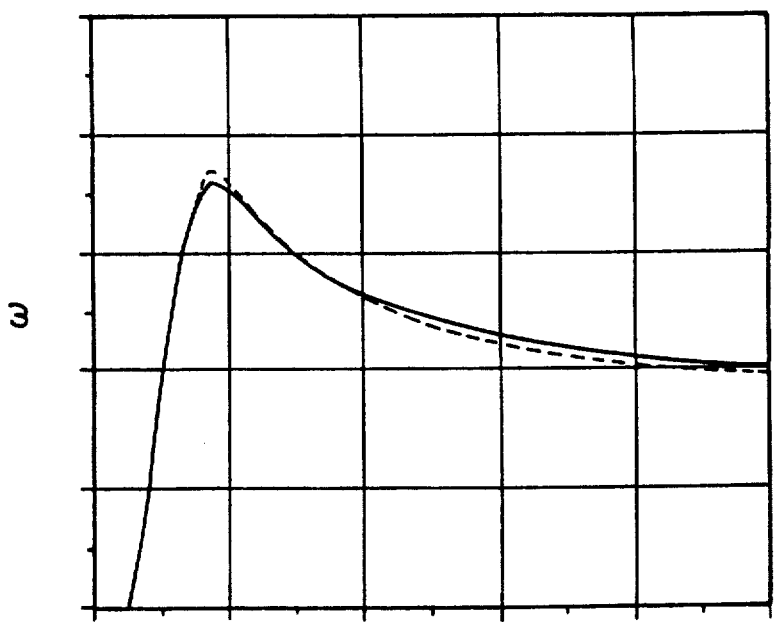
FIG. 9 is a chart showing the yaw rate of a vehicle equipped with the four-wheel drive torque transfer mechanism of the present invention as compared with that of vehicle equipped with a conventional four-wheel drive torque transfer mechanism.

FIG. 9 is a chart showing the yaw rate of a vehicle equipped with the four-wheel drive torque transfer mechanism of the present invention as compared with that of a vehicle equipped with a conventional four-wheel drive torque transfer mechanism.

In the drawing, the solid line represents the yaw rate $\omega$ of the vehicle equipped with the f our-wheel drive torque transfer mechanism of the present invention, and the broken line represents the yaw rate $\omega$ of the vehicle equipped with the conventional four-wheel drive torque transfer mechanism.

The vehicle equipped with the four-wheel drive torque transfer mechanism of the present invention exhibits a maximal yaw rate ω lower than that of the vehicle equipped with the conventional four-wheel drive torque transfer mechanism, and provides an accordingly better riding quality.

Figure 10:
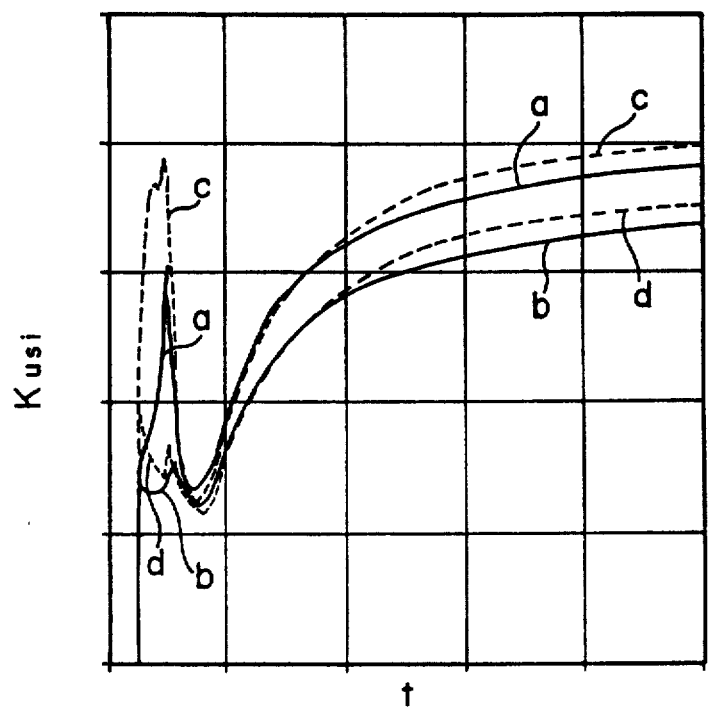
FIG. 10 is a chart showing understeering coefficients of a vehicle equipped with the four-wheel drive torque transfer mechanism of the present invention as compared with those of a vehicle equipped with a conventional four-wheel drive torque transfer mechanism.

FIG. 10 is a chart showing understeering coefficients of a vehicle equipped with the four-wheel drive torque transfer mechanism of the present invention as compared with those of a vehicle equipped with a conventional four-wheel drive torque transfer mechanism.

In the drawing, the solid lines (a) and (b) represent the understeering coefficients $K_{usi}$ of the left and right front drive wheels, respectively, of the vehicle equipped with the four-wheel drive torque transfer mechanism of the present invention, and the broken lines (c) and (d) represent the understeering coefficients $K_{usi}$ of the left and right front drive wheels, respectively, of the vehicle equipped with the conventional four-wheel drive torque transfer mechanism.

In the vehicle equipped with the four-wheel drive torque transfer mechanism of the present invention, the understeering coefficients $K_{usi}$ immediately after starting a turn can be made smaller than those of the vehicle equipped with the conventional four-wheel drive torque transfer mechanism. Thus, it will be understood that the vehicle equipped with the four-wheel drive torque transfer mechanism of the present invention provides a relatively high level of responsiveness immediately after starting a turn. Further, the vehicle equipped with the four-wheel drive torque transfer mechanism of the present invention allows the final values of the understeering coefficients $K_{usi}$ to be made smaller than those of the vehicle equipped with the conventional four-wheel drive torque transfer mechanism, thus making it possible to make a turn in the neutral steering condition.

Figure 11:
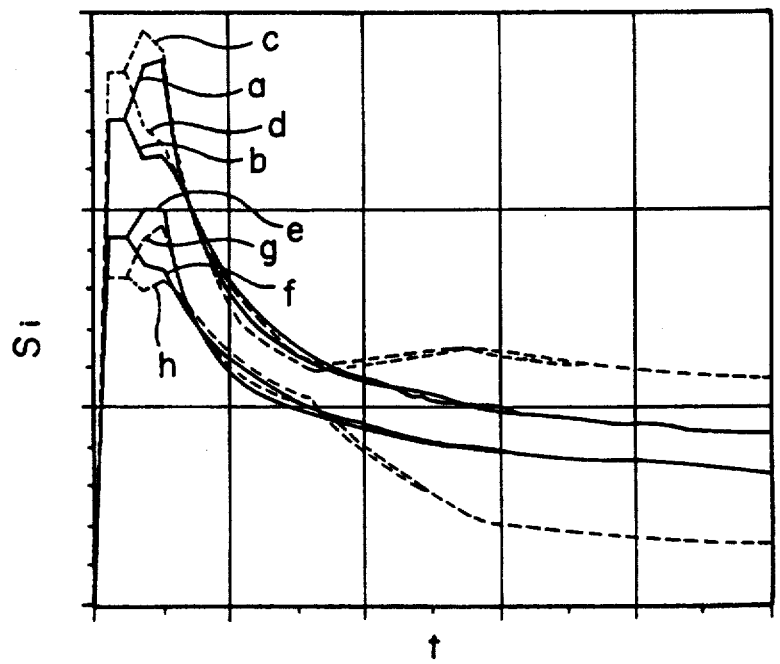
FIG. 11 is a chart showing the fore-aft slip ratios of a vehicle equipped with the four-wheel drive torque transfer mechanism of the present invention as compared with those of a vehicle equipped with a conventional four-wheel drive torque transfer mechanism.

FIG. 11 is a chart showing the fore-aft slip ratios of a vehicle equipped with the four-wheel drive torque transfer mechanism of the present invention as compared with those of a vehicle equipped with a conventional four-wheel drive torque transfer mechanism.

In the drawing, the solid lines (a) and (b) represent the fore-aft slip ratios $S_i$ of the left and the right front drive wheels, respectively, of the vehicle equipped with the four-wheel drive torque transfer mechanism of the present invention, and the broken lines (c) and (d) represent the fore-aft slip ratios $S_i$ of the left and right front drive wheels, respectively, of the vehicle equipped with the conventional four-wheel drive torque transfer mechanism.

Further, the solid lines (e) and (f) respectively represent the fore-aft ratios slip $S_i$ of the left and the right rear drive Wheels of the vehicle equipped with the four-wheel drive torque transfer mechanism of the present invention, and the broken lines (g) and (h) respectively represent the fore-aft slip ratios $S_i$ of the left and the right rear drive wheels of the vehicle equipped with the conventional four-wheel drive torque transfer mechanism.

With the vehicle equipped with the four-wheel drive torque transfer mechanism of the present invention, not only can the fore-aft slip ratios $S_i$ of the front drive wheels immediately after starting a turn be made smaller than those of the vehicle equipped with the conventional four-wheel drive torque transfer mechanism, but also it is possible to approximate the values of the fore-aft slip ratios $S_i$ of the front and the rear drive wheels during turning, thereby making it possible for the vehicle to safely make a turn at high speed before the degree of contact between the wheels and the ground has reached the limit.

Figure 12:
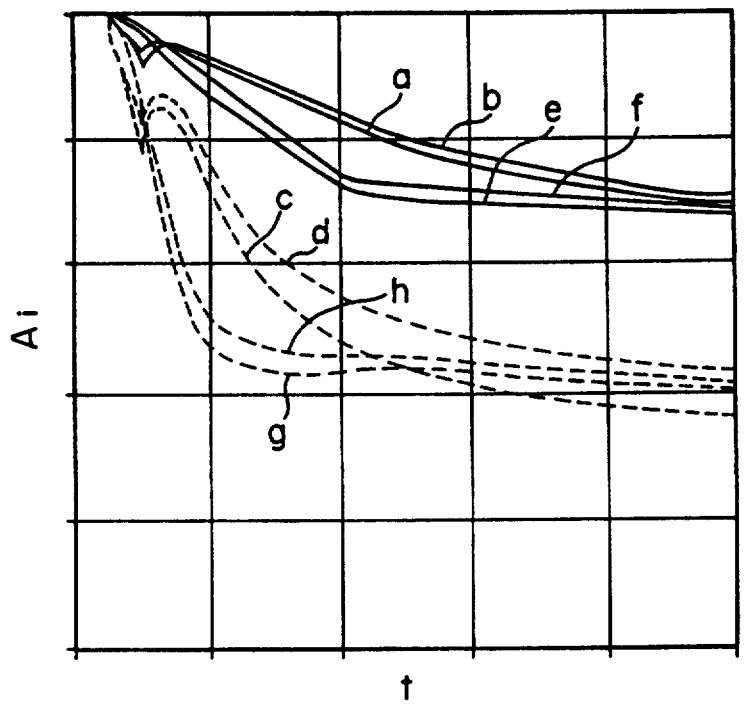
FIG. 12 is a chart showing the slip angles of a vehicle equipped with the four-wheel drive torque transfer mechanism of the present invention as compared with those of a vehicle equipped with a conventional four-wheel drive torque transfer mechanism.

FIG. 12 is a chart showing the slip angles of a vehicle equipped with the four-wheel drive torque transfer mechanism of the present invention as compared with those of a vehicle equipped with a conventional four-wheel drive torque transfer mechanism.

In the drawing, the solid lines (a) and (b) represent the slip angles $A_i$ of the left and the right front drive wheels, respectively, of the vehicle equipped with the four-wheel drive torque transfer mechanism of the present invention, and the broken lines (c) and (d) represent the slip angles $A_i$ of the left and the right front drive wheels, respectively, of the vehicle equipped with the conventional four-wheel drive torque transfer mechanism.

Further, the solid lines (e) and (f) respectively represent the slip angles $A_i$ of the left and the right rear drive wheels of the vehicle equipped with the four-wheel drive torque transfer mechanism of the present invention, and the broken lines (g) and (h) respectively represent the slip angles $A_i$ of the left and the right rear drive wheels of the vehicle equipped with the conventional four-wheel drive torque transfer mechanism.

With the same cornering power, the vehicle equipped with the four-wheel drive torque transfer mechanism of the present invention exhibits slip angles $A_i$ during turning which are smaller than those of the vehicle equipped with the conventional four-wheel drive torque transfer mechanism, thereby making it possible to impart a more uniform cornering power to the four wheels. Accordingly, the behavior of the vehicle during turning is more stable.

Figure 13:
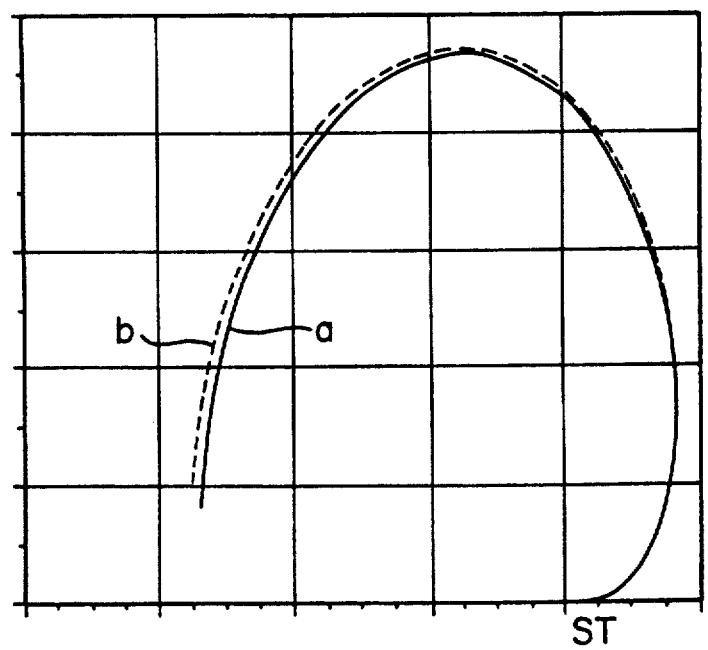
FIG. 13 is a chart showing the turning locus of a vehicle equipped with the four-wheel drive torque transfer mechanism of the present invention as compared with that of a vehicle equipped with a conventional four-wheel drive torque transfer mechanism.

FIG. 13 is a chart showing the turning locus of a vehicle equipped with the four-wheel drive torque transfer mechanism of the present invention as compared with that of a vehicle equipped with a conventional four-wheel drive torque transfer mechanism.

In the drawing, the solid line (a) represents the turning locus of the vehicle equipped with the four-wheel drive torque transfer mechanism of the present invention, and the broken line (b) represents the turning locus of the vehicle equipped with the conventional four-wheel drive torque transfer mechanism. The symbol ST indicates the point at which the turning is started.

The vehicle equipped with the four-wheel drive torque transfer mechanism of the present invention is capable of running along a locus which is radially inward of that of the vehicle equipped with the conventional four-wheel drive torque transfer mechanism, thus realizing a condition akin to the neutral steering state.

While in the above embodiment the central differential gear 15 is used to distribute torque to the front-wheel differential gear 26 and the rear-wheel differential gear 28, it is also possible to distribute torque by connecting one shaft of the central differential gear 15 directly to the transfer gear and connecting the other shaft thereof to a mechanism which allows torque ratio control (e.g. a combination of an eddy current coupling and a mechanical clutch).

Further, the central differential gear 15 may also consist of a planetary gear unit. Further, it is also possible to make the final reduction ratios of the front and the rear wheels different, thereby making the torque distribution between the front and the rear wheels uneven and widening the range of the torque ratio.

It is to be understood that the present invention is not limited to the above embodiment. Various modifications can be made in the present invention without departing from the spirit and scope thereof.

We claim:

1. A vehicular four-wheel drive torque transfer mechanism for receiving torque output from a transmission and selectively distributing the transmission output torque to each of four wheel drive shafts, said four-wheel drive torque transfer mechanism comprising:
   (a) a central differential for receiving said transmission output torque and selectively dividing said transmission output torque into front-wheel torque and rear-wheel torque;
   (b) front-wheel drive means for receiving said front wheel torque and for driving said front wheels;
   (c) rear-wheel drive means for receiving said rear wheel torque and driving said rear wheels;
   (d) differential limiting means for controlling the operation of said central differential to vary the ratio of said front wheel torque to said rear wheel torque responsive to a control torque signal;
   (e) detection means for detecting a plurality of vehicle turning parameters;
   (f) memory means for storing control gain values corresponding to optimized turning characteristics for each of said turning parameters; and
   (g) control means for:
      (i) reading from said memory control gain values for each of said plural detected vehicle turning parameters;
      (ii) calculating control torque as the sum of the products obtained by multiplying each of said detected vehicle turning parameters by the corresponding control gain value read from said memory; and
      (iii) generating said control torque signal in accordance with said calculated control torque.

2. A four-wheel drive torque transfer mechanism according to claim 1, wherein said turning parameters include at least vehicle velocity, vehicle lateral acceleration, and the yaw rate of the vehicle.

3. A four-wheel drive torque transfer mechanism according to claim 1, wherein at least one of said control gain values is a value calculated on the basis of the understeering coefficients of the drive wheels.

4. A four-wheel drive torque transfer mechanism according to claim 2, wherein at least one of said control gain values is a value calculated on the basis of the understeering coefficients of the drive wheels.

5. A four-wheel drive torque transfer mechanism according to claim 1, wherein said differential limiting means comprises a differential limiting clutch, a hydraulic servo for controlling slippage of said differential limiting clutch, and a solenoid value for supplying said hydraulic servo with a fluid pressure corresponding to said control torque signal.

6. A four-wheel drive torque transfer mechanism according to claim 2, wherein said differential limiting means comprises a differential limiting clutch, a hydraulic servo for controlling slippage of said differential limiting clutch, and a solenoid valve for supplying said hydraulic servo with a fluid pressure corresponding to said control torque signal.

7. A four-wheel drive torque transfer mechanism according to claim 3, wherein said differential limiting means comprises a differential limiting clutch, a hydraulic servo for controlling slippage of said differential limiting clutch, and a solenoid valve for supplying said hydraulic servo with a fluid pressure corresponding to said control torque signal.

8. A four wheel drive torque transfer mechanism according to claim 4, wherein said differential limiting means comprises a differential limiting clutch, a hydraulic servo for controlling slippage of said differential limiting clutch, and a solenoid valve for supplying said hydraulic servo with a fluid pressure corresponding to said control torque signal.

9. A four-wheel drive torque transfer mechanism according to claim 5, wherein said central differential comprises a pinion shaft and two side gears, connected to said pinion shaft, for transmitting torque to said front wheel drive means and said rear wheel drive means, respectively.

10. A four-wheel drive torque transfer mechanism according to claim 6, wherein said central differential comprises a pinion shaft and two side gears, connected to said pinion shaft, for transmitting torque to said front wheel drive means and said rear wheel drive means, respectively.

11. A four-wheel drive torque transfer mechanism according to claim 7, wherein said central differential comprises a pinion shaft and two side gears, connected to said pinion shaft, for transmitting torque to said front wheel drive means and said rear wheel drive means, respectively.

12. A four-wheel drive torque transfer mechanism according to claim 8, wherein said central differential comprises a pinion shaft and two side gears, connected to said pinion shaft, for transmitting torque to said front wheel drive means and said rear wheel drive means, respectively.

13. A four-wheel drive torque transfer mechanism according to claim 1 wherein each of said front wheel drive means and said rear wheel drive means comprises a differential for distributing torque to left and right wheels.

* * * * *

UNITED STATES PATENT AND TRADEMARK OFFICE
CERTIFICATE OF CORRECTION

PATENT NO. : 5,301,768
DATED : April 12, 1994
INVENTOR(S) : ISHIKAWA et al

It is certified that error appears in the above-indentified patent and that said Letters Patent is hereby corrected as shown below:

Col. 1, line 6, delete "f our" insert --four--.

Col. 2, line 20, "ple one" should read --ple, one--.

Col. 3, line 17, "f or" should read --for--.

Col. 4, line 47, after "sion" insert --is--.

Col. 5, line 3, "tho" should read --the--.

Col. 7, in formula (3), line 18, "+$K_B$" should read --$K_2$--.

Col. 8, line 13, "ROM" should read --RAM--;

line 17, "ROM" should read --RAM--; and line 31, "sale" should read --same--.

Col. 9, line 2, "w" should read --$\omega$--.

Col. 10, line 2, delete "tire" insert --the--;

line 37, "f our" should read --four--; and line 62, "f our" should read --four--.

UNITED STATES PATENT AND TRADEMARK OFFICE
CERTIFICATE OF CORRECTION

PATENT NO. : 5,301,768
DATED : April 12, 1994
INVENTOR(S) : ISHIKAWA et al

It is certified that error appears in the above-indentified patent and that said Letters Patent is hereby corrected as shown below:

Col. 11, line 17, delete "f";

line 18, "our" should read --four--;

line 19, "f our" should read --four--;

line 33, "f our" should read --four--;

line 51, "ratios slip" should read --slip ratios--;

line 52, "Wheels" should read --wheels--.

Col. 12, line 9, "A," should read --$A_1$--; and line 29, "f our" should read --four--.

Signed and Sealed this

Twenty-first Day of March, 1995

Attest:

BRUCE LEHMAN

Attesting Officer

Commissioner of Patents and Trademarks